UNITED STATES PATENT OFFICE.

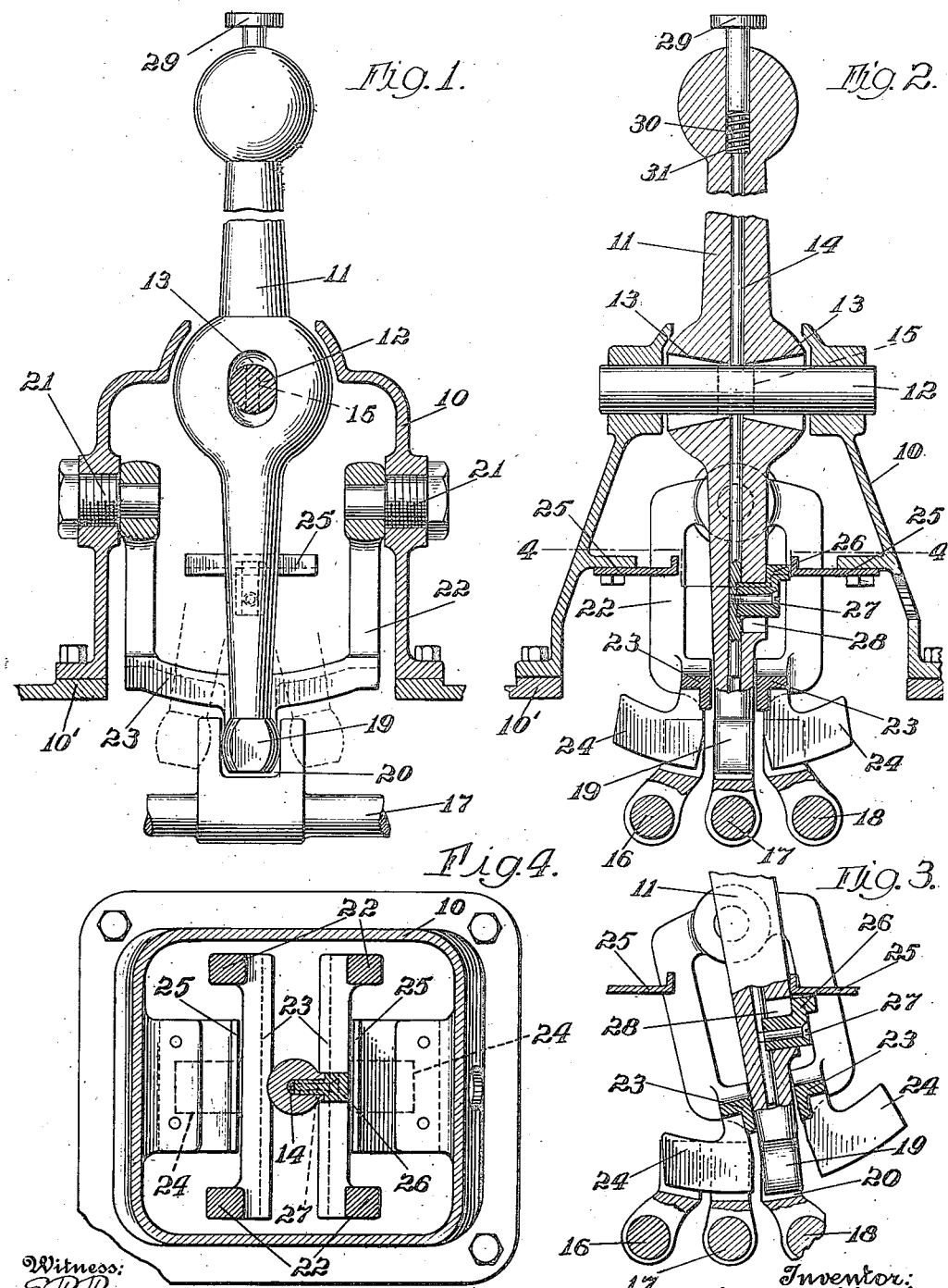

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

GEAR-SHIFTING MECHANISM.

1,305,063.        Specification of Letters Patent.        Patented May 27, 1919.

Application filed November 12, 1915. Serial No. 61,078.

*To all whom it may concern:*

Be it known that I, HAROLD D. CHURCH, a citizen of the United States, and resident of Detroit, Wayne county, State of Michigan, have invented certain new and useful Improvements in Gear-Shifting Mechanism, of which the following is a specification.

This invention relates to motor vehicles and particularly to gear shifting mechanism therefor.

One of the objects of the invention is to provide positive means for insuring the entrance of the gear shifter lever into engagement with the slot of any desired shifter rod.

Another object of the invention is to positively lock in neutral position all but the gear rod to be shifted.

Further objects will appear from the following description taken in connection with the drawings, which form a part of this specification, and in which:

Figure 1 is a sectional view of an embodiment of this invention;

Fig. 2 is a sectional view taken at right angles to Fig. 1;

Fig. 3 is a view similar to Fig. 2 showing the parts in a different relation; and Fig. 4 is a section taken on the line 4—4 of Fig. 2.

Referring to the drawings the reference numeral 10 designates a supporting member or bracket preferably hollow upon which a gear shifter lever 11 is mounted. Turning in bearings at the top of the bracket at either side of an opening is a horizontal pin 12 to which the lever 11 passing through said opening is secured. The openings in the lever 11 through which the pin passes are inwardly tapered as at 13 to permit of a lateral oscillating or rocking movement. The lever is held in position on the pin 12 by means of a rod 14 which passes through an opening 15 in the pin. The opening is made of sufficient size longitudinally of the pin to permit of the lateral movement above referred to.

The supporting member is shown as mounted upon the usual gear casing 10' which in this case contains a selective gearing having three shifter rods 16, 17 and 18 connected in any suitable way with the transmission gears so that the latter may be shifted by the reciprocation of the rods. The rods are reciprocated by the movements of the shifter lever 11 in the bracket 10, through the meshing of the rounded end 19 of the lever with slots 20 in the shifter rods.

The rods 16 and 17 may be connected to control the forward speeds and the rod 18 to control the reverse speed. The reciprocation of the rods 16 and 17 gives the varied forward speeds which may be four in number. When the gears are in the neutral position the slots 20 are in alinement and the lever being oscillated laterally will bring the end 19 into engagement with the slot in the desired rod. To insure the alinement the following device is employed.

Trunnioned in the supporting member upon pins 21 and on a line at right angles to the pin 12 is a double yoke member 22 which is capable of oscillation in the same direction as the lateral oscillation of the lever 11. The member 22 is so shaped that the lower parts 23 of the yokes are close to the lever 11 as shown in Fig. 2. Secured to or formed integral with each yoke at the lower part are arms 24 which project outwardly and at either side of the end 19 so that when the lever is in the neutral position the arms 24 and end 19 are in the same vertical plane. Since the slots in the shifter rods are in alinement at this time it follows that the arms 24 will be within the slots 20 in rods 16 and 18 while the end 19 is within the slot 20 in the rod 17. (See Fig. 2.) The arms 24 are of a length sufficient to span two of the shifter rods and hence, as shown in Fig. 3, when the end 19 engages an outer rod, one of the arms 24 is within the slots in the other rods. The lateral oscillation of the gear lever on the pin 12 is limited by stop plates 25 within the walls of the supporting member. These plates 25 may be integral with the supporting member or may be removably secured thereto in the manner shown in Fig. 2.

The gear shifting mechanism, in order to prevent inadvertent use of the reversing mechanism, is so constructed that an additional deliberate act on the part of the operator must precede the shifting of the reversing gears. Thus a block 26 is mounted in the shifting lever which block will contact with the stop plate 25 when the lever is swung from the outer rod 16, to the center rod 17. When it is desired to engage the rod 18 the block 26 is depressed to allow the lever to swing into the position shown in Fig. 3. The block 26 is fastened by a screw 27 to the rod 14 previously referred to and is guided by the slot 28. The upper end of the rod 14 carries a knob 29 which is pressed upwardly above the handle of the lever by a spring 30 surrounding the rod and bearing against the knob 29 and the bottom of an opening 31 in which the knob reciprocates. A depression of the rod 14 will carry the block 26 below the plate 25 and the lever end 19 may then be swung over to engage the rod 18 and shift the reversing gear.

The support 10 is detachably secured to the casing 10' and may be lifted bodily therefrom. The parts may be dismantled by first removing the pins 21 and the yoke member 22, then detaching the plates 25. The block 26 is then removed by loosening the screw 27, inserting the screw driver through the opening 32 in the casing for this purpose, and the rod 14 may be withdrawn. The removal of the rod 14 releases the pin 12 which is then driven out and the lever 11 is removed downwardly through the opening in the top of the supporting member, the latter being large enough to permit the handle to pass.

A single embodiment has been shown and described but it will be understood that the invention is not limited thereto since it is apparent that modifications may be made within the spirit and scope of the invention.

Having thus described my invention what I claim and desire to secure by Letters Patent is:

1. In a gear shifting mechanism, the combination of shifter rods, a gear shifter lever adapted to oscillate to mesh with the shifter rods, and means to limit said oscillation in one direction at the center rod and in the other direction at an outer rod.

2. In a gear shifting mechanism, the combination of rods, a gear shifter lever adapted to oscillate to mesh with the shifter rods, means to limit said oscillation in one direction at the center rod and in the other direction at one outer rod, and means manually controlled to prevent the operation of said first named means until the lever is at the other outer rod.

3. In a gear shifting mechanism, in combination, an oscillatory gear shifter lever, a block projecting from the side of said lever, means to contact with said block and stop the lever oscillation, and means carried by the lever for shifting the block and preventing the contact.

4. The combination with a series of gear shifting devices, of a supporting member, a pin in said member, a lever for operating said devices mounted on said pin to permit rocking and lateral movement, a locking member trunnioned in said supporting member in a horizontal plane below said pin and locking arms on said member.

5. The combination with a series of gear shifting devices, of a supporting member, a pin in said member, a lever for operating said devices mounted on said pin to permit rocking and lateral movement, pins mounted in said supporting member on a line below and at right angles to the first named pin, and a locking member trunnioned on said second named pins.

6. In a gear shifting mechanism, the combination of a plurality of shifter rods, a support, a gear shifter lever mounted on said support and adapted to oscillate in one plane to mesh with a shifter rod and at right angles thereto to shift such rod, and a pivoted double yoke member mounted on said support below the point of mounting of said lever actuated by the lower end of said shifter lever to lock the remaining shifter rods from movement.

7. In a gear shifting mechanism, the combination of a plurality of shifter rods, a support, a gear shifter lever mounted on said support and adapted to oscillate in one plane to mesh with a shifter rod and at right angles thereto to shift such rod, and a double yoke member pivoted on said support and actuated by the contact of said shifter lever with a portion of said yoke member below its pivot to lock the remaining shifter rods from movement.

8. In a gear shifting mechanism, the combination of a plurality of shifter rods, a support, a gear shifter lever mounted on said support and adapted to oscillate in one plane to mesh with a shifter rod and at right angles thereto to shift such rod, and a double yoke member pivoted on said support below the point of mounting of said lever and positioned on opposite sides of said shifter lever so that the lever when oscillating into mesh with one shifter rod will contact with and cause the yoke member to oscillate on its pivot and lock the remaining rods from movement.

In testimony whereof I affix my signature.

HAROLD D. CHURCH.